United States Patent

Balz

[15] 3,703,673

[45] Nov. 21, 1972

[54] POWER DRIVEN POSITIONING APPARATUS WITH FORCE DEPENDENT SHUT-OFF, TO POSITION AN ENGAGEMENT ELEMENT AGAINST AN ABUTMENT

[72] Inventor: Jürgen Bälz, Heilbronn, Neckar, Germany

[73] Assignee: Firma Helmut Balz GmbH, Heilbronn, Neckar, Germany

[22] Filed: Nov. 19, 1971

[21] Appl. No.: 200,453

[30] Foreign Application Priority Data

July 14, 1971  Germany..........P 21 35 094.7

[52] U.S. Cl.................318/468, 192/142 R, 200/47, 251/134
[51] Int. Cl...............................................H02p 3/00
[58] Field of Search.............192/142 R, 150; 200/47; 251/134; 318/266, 466, 468, 477, 476

[56] References Cited

UNITED STATES PATENTS 2,407,537  9/1946  Chapman...................192/150
3,150,752  9/1964  Baumann................251/134 X
3,524,526  8/1970  Denkowski................192/150

Primary Examiner—Bernard A. Gilheany
Assistant Examiner—Thomas Langer
Attorney—Flynn & Frishauf

[57] ABSTRACT

A housing, preferably separable into shells encloses a generally U-shaped leaf spring, having projecting legs extending into the housing. A spindle passes through the projecting legs, the spindle being motor driven and connected by threads with the engagement element to provide axial movement of the engagement element upon rotation of the spindle. The spindle is guided in the housing by a sleeve formed in the housing which surrounds axially movable bearings. The bearings are held in axial position by the leg portions of the U-shaped spring, but following axial excursion of the spindle, if the engagement element connected thereto strikes an abutment, causing deflection of the leaf spring and operation of electrical switches as the leg portions of the leaf springs deflect.

10 Claims, 3 Drawing Figures

POWER DRIVEN POSITIONING APPARATUS WITH FORCE DEPENDENT SHUT-OFF, TO POSITION AN ENGAGEMENT ELEMENT AGAINST AN ABUTMENT

CROSS REFERENCE TO RELATED APPLICATIONS AND PATENTS

U.S. Patent 3,616,884; U.S. Serial 56,608; U.S. Serial 106,030 filed January 13, 1971; U.S. Serial 200,549 filed November 19, 1971.

The present invention relates to a power driven positioning apparatus, and more particularly to such an apparatus in which an engagement element is pressed with a predetermined force against an abutment, the force being discontinued when the engagement element strikes the abutment. Such apparatus is used, for example, in connection with the positioning of valve elements in valve seats.

Positioning apparatus in which the final positioning force is predetermined have previously been described, see, for example, the cross referenced patents and applications. In accordance with one of the previously disclosed embodiments of such positioning drives, a generally U-shaped leaf spring is provided, having projecting legs. Ball bearings are located at the outside of the legs of the leaf spring, the ball bearings being retained in axial position in the housing, with respect to a rotating spindle, by the leg portions of the leaf spring. If the spindle strikes an abutment, it will be subject to axial excursion, carrying along one of the ball bearings (or permitting a ball bearing to be spring-pressed to move in axial direction). Operating elements, for example located between the leaf spring, are then located in the housing, the operating elements engaging electrical switches to shut off electrical current to a motor driving the spindle. In one construction, a sleeve is located between the legs of the U-shaped spring, having an axial dimension which is just slightly less than the distance between the legs of the spring, the sleeve being formed with cam surfaces to operate electrical switches. Such a construction is shown in detail in the cross referenced patent application Ser. No. 200,549.

Positioning drives as described are reliable and can be simply constructed. Under some conditions, however, the axial loading of the walls of the housing which retain the bearings journalling the spindle is undesired, since the housing thus must be made larger or stronger to accept this axial loading.

It is an object of the present invention to provide a positioning drive, particularly adapted for valves or the like, which is simple in construction, and in which the housing can be made easily and does not require a strong structure capable of accepting substantial counter forces.

SUBJECT MATTER OF THE INVENTION

Briefly, a housing is provided through which a spindle passes, the spindle being motor driven. In a preferred form, the motor is held in the housing by being form-fitted, or frictionally engaged therein. The housing is preferably made of separable shell parts. A U-shaped spring is located in the housing, the legs of the spring extending towards the spindle, and the spindle passing therethrough transversely to the legs. The housing is formed with a guide surrounding the spindle, the bearings being interposed between the spindle and the guide in the housing. The bearings are so arranged that they are axially movable with the spindle (for example by forming a groove in the spindle, locating balls on the groove and forming the bearings with races having shoulders thereon, engaged by the balls) so that, when the spindle is subject to axial excursion, for example when a valve element meets a valve seat, a bearing portion will be carried along against the force of the legs of the leaf spring and will move axially. This will cause deflection of the legs of the leaf spring, against the resiliency of the spring itself. This deflecting movement is used to operate a micro switch, or the like, located between the legs of the leaf spring.

By locating the ball bearings in a sleeve or socket element formed on the housing and extending between the legs of the leaf spring, it is unnecessary to provide transverse separating walls, or other holders for the bearings which are sufficiently strong to accept the counter force, generated by the positioning force of the engagement element striking the abutment, such as a valve engaging the valve seat.

The construction can be particularly simplified if a pair of shut-off switches are located between the legs of the leaf spring, the shut-off switches having operating elements, such as buttons, directly operated by deflection of the leaf spring. The socket, or sleeve holding the bearings within the housing is preferably provided with internal ribs in order to prevent rotation of the outer bearing race within the housing, while permitting axial displacement thereof.

Under normal operating conditions, that is, when the positioned element travels between extreme positions, the spindle is axially unloaded and the outer races of the ball bearings are resiliently compressed towards each other by the leaf spring. The base, or bend of the U-shaped leaf spring is preferably directly secured in the housing wall.

It is sometimes desired to provide different movements from a spindle, such as axial movement to position a valve and, in addition, or instead thereof, rotary movement, for example to shift simultaneously with changing of the position of a valve member, the position of a throttle or choke. The present invention permits ready adaptation of such additional positioning member by forming a portion of the axially moving excursion element with rack teeth, and placing a shaft, carrying a pinion adjacent the rack teeth, the pinion engaging the rack teeth themselves for rotary motion upon axial displacement of the displacement element. To prevent deflection of the displacement element against the engagement force of the pinion teeth, a counter, or back-up roller is preferably provided.

The invention will be described by way of example with reference to the accompanying drawings, wherein.

Figure 1:
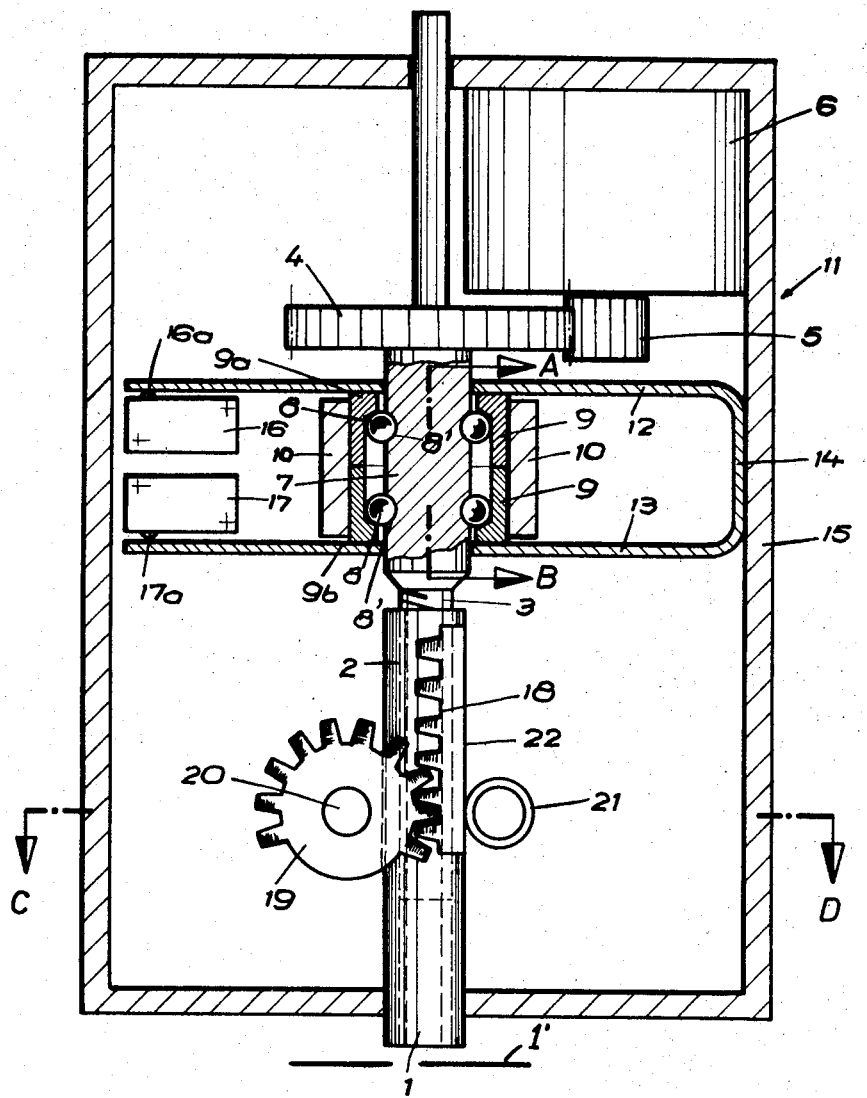
FIG. 1 is a longitudinal sectional view of the positioning apparatus.

A shaft or rod member 1 is held against rotation by means (not shown) and well known in the art, adapted to engage an abutment 1'. The upper end of rod 1 is tapped and threaded, axial movement of rod 1 being obtained by rotation of a threaded spindle 3 engaging threads 2 within the upper end of rod 1. Spindle 3 is rotatably driven by a gear 4, engaging a pinion 5, driven by an electric motor 6.

Spindle 3 is guided for rotation, and axial position by an enlarged cylindrical portion 7, forming also the inner race of a pair of ball bearings 8, 9. Balls 8 are guided axially in grooves 8' formed in enlarged portion 7 on the spindle; the outer races for the balls 8 are formed by ball bearing shells 9, having shoulders 9a, 9b and axially bearing from the bottom, and from the top against the circumference of the balls 8. The outer races 9 are located in a cylindrical bore of a bearing socket or sleeve 10. Bearing socket 10 forms part of housing 11. Housing 11, itself, is formed as a pair of shells 11a, 11b (FIG. 2) suitably secured together (for example by bolts, not shown, flanges, or the like) and having a separating plane passing through the center of rod 1, and thus also of spindle 3. The housing shells or halves 11a, 11b are so shaped that the electric motor 6 is retained within the housing shells by interfitting engagement therein, for example by being frictionally held, or press-fitted. The bearing socket 10 is also formed of two parts, one each being secured to one of the half shells 11a, 11b of the housing 11, each one having a semi-cylindrical inner form so that, when the housing halves are fitted together, a cylindrical bore will result, in which the two ball bearing races 9 can be located.

Figure 3:
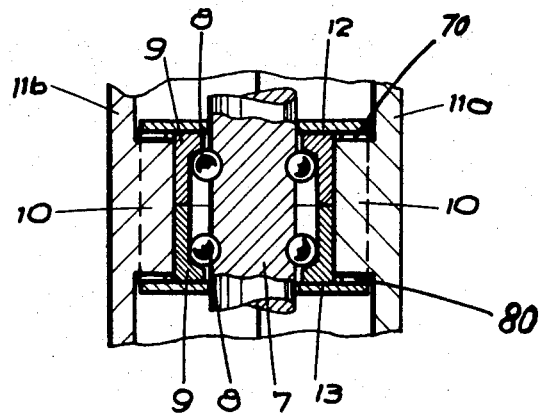
FIG. 3 is a fragmentary partial view along lines A–B, to an enlarged scale and rotated by 90° with respect to FIG. 1.

A generally U-shaped leaf spring has projecting legs 12, 13, extending about the bearing socket 10. The two legs 12, 13 are interconnected by a bend, or base portion 14 of the spring, the base portion 14 bearing on the inside against a wall 15 of the housing 11. The bearing socket 10 is formed with ribs 70, 80, against which the legs 12, 13 can bear and which further fix the outer surfaces 9a, 9b of the ball bearing races 9 in axial direction (FIG. 3).

A pair of final positioning switches 16, 17, having operating elements 16a, 17a, respectively, are located between the legs 12, 13 of the leaf spring. The operating elements may be buttons or the like, and form part of the shut-off mechanism, being electrically connected to the motor 6, or other control equipment.

OPERATION

Let it be assumed that rod 1 is part of a valve element, and reaches the final, terminal position. The terminal position will depend on the direction of rotation of spindle 3, causing rod 1 to be screwed in, or out of the spindle. Upon reaching of a terminal position, an axial excursion of the spindle 3 will result. The balls 8, running within grooves 8' of the portion 7 on the spindle will be subject to axial excursion, and carry along the outer race 9, due to engagement of the ball 8 with the inner shoulder of the outer race of the ball bearings. Axial movement of the outer race of the ball bearing causes spreading of the leg portions of the leaf spring, against the resilient force of the leaf spring, and operation of the associated switch 16, or 17, effecting electrical control function, for example shut-off of motor 6.

Figure 2:
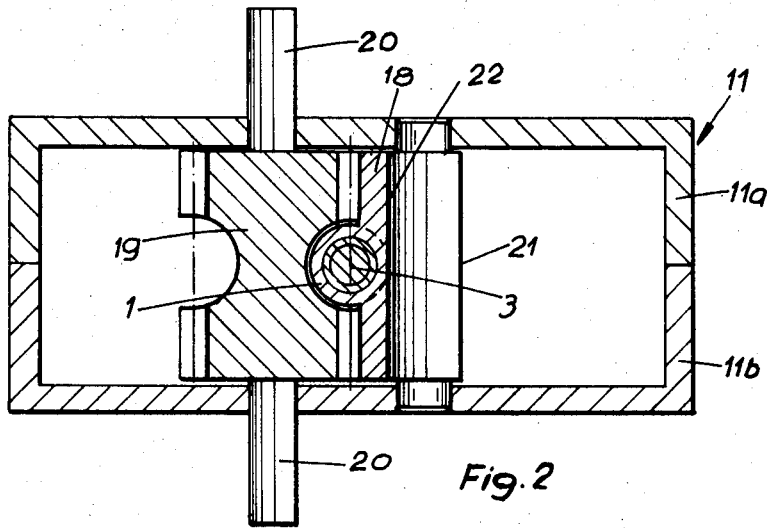
FIG. 2 is a transverse sectional view along lines C–D of FIG. 1.

From time to time it is desired to provide, in addition to a final positioning in axial direction, a drive which provides rotary motion over a limited extent. This is desired, for example, when valves are to be controlled to operate flaps, chokes, vanes, or the like. Additional operation can be obtained by forming a portion of rod 1 as a rack 18, which is engaged by a pinion 19, rotatably held on a shaft 20 which, in turn, is journalled in housing 11 (FIG. 2). Rotation of shaft 20 thus is coupled to translatory motion of rod 1. To prevent bending of rod 1 due to transfer of torque transferred between the pinion 19 and rack 18, the side of the rod 1 opposite the rack surface 18 is supported by a counter or back-up roller 21, engaging a flat surface 22 formed on rod 1 (FIG. 2).

Various changes and modifications may be made within the inventive concept.

I claim:

1. Power driven positioning apparatus with force-dependent shut-off, to position an engagement member (1) against an abutment (1') comprising
   a housing (15);
   a spindle (3) passing through the housing and adapted to be connected to the element to be positioned with predetermined force against the abutment;
   a motor (6) in driving engagement (4, 5) with the spindle (3), the spindle being subject to axial excursion when the element impinges on the abutment;
   bearing means (8, 9) axially spaced on the spindle and journalling the spindle, the bearing means being axially movable with the spindle upon axial excursion thereof;
   means (10) located in the housing guiding the axial movement of the bearing means;
   spring means (12, 13, 14) having projecting portions (12, 13) and an attachment portion (14), the projecting portions extending over the bearing means and holding said bearing means between the projecting portions in pre-determined axial position, the attachment portion being secured to the housing;
   and switch means (16, 17) engageable by the projecting portions of the spring means upon deflection of the spring means due to engagement of the bearing means with the projecting portions of the spring means upon axial excursion of the spindle.

2. Apparatus according to claim 1, wherein the switch means comprises a pair of electrical switches (16, 17) having respective operating elements (16a, 17a) each, located in the housing for engagement of the operating elements by the projecting portions of the spring means.

3. Apparatus according to claim 1, wherein the guide means guiding the bearing means are slightly shorter than the distance between the projecting portions of the spring means.

4. Apparatus according to claim 3, wherein the bearing means comprises stationary and rotary races, and the spring means locate the stationary races in axial position with respect to the spindle within the housing.

5. Apparatus according to claim 3, wherein the bearing means are ball bearing means and comprise grooves formed in the spindle, balls running in the grooves, and outer races carried along in axial direction upon axial excursion of the spindle, and hence the balls in the grooves of the spindle, said outer races being resiliently compressed against each other by the projecting portions of the spring means.

6. Apparatus according to claim 1, wherein the housing comprises a pair of substantially symmetrical shells having a separating plane passing through the axis of the spindle.

7. Apparatus according to claim 6, wherein the motor has an outer circumference form-fitting into the housing.

8. Apparatus according to claim 1, wherein the spring means comprises a U-shaped leaf spring, the attachment portion forming the base portion of the U-shaped leaf spring and being located in engagement with the wall portions of the housing, the projecting portions being formed by the leg portions of the U-shaped leaf spring.

9. Apparatus according to claim 1, wherein the engagement means (1) is non-rotatable and subject to axial travel upon rotation of the spindle (3), said engagement element being formed with a rack surface; and a pinion (19) engaging the rack surface.

10. Apparatus according to claim 9, including a pinion shaft (20) securing the pinion (19) in position for engagement with the rack surface;

and a counter roller (21) located to bear against the backside of the rack surface and prevent deflection of the rack surface away from the pinion shaft.

* * * * *